(12) United States Patent
Wu

(10) Patent No.: US 12,216,861 B2
(45) Date of Patent: *Feb. 4, 2025

(54) CAPACITIVE TOUCH CONTROL SYSTEM WITH FREQUENCY BOOSTER

(71) Applicant: PixArt Imaging Inc., Hsin-Chu County (TW)

(72) Inventor: Sung-Han Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,587

(22) Filed: Jul. 21, 2023

(65) Prior Publication Data

US 2023/0359304 A1 Nov. 9, 2023

Related U.S. Application Data

(63) Continuation of application No. 17/739,768, filed on May 9, 2022, now Pat. No. 11,747,939.

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC ................. G06F 3/04166; G06F 3/044; G06F 2203/04114; G06F 3/0446
See application file for complete search history.

(56) References Cited

U.S. PATENT DOCUMENTS

| 10,778,270 | B1* | 9/2020 | Jansen | ................ H01L 25/0655 |
| 2010/0155153 | A1* | 6/2010 | Zachut | ................ G06F 3/04162 178/18.03 |
| 2016/0048227 | A1* | 2/2016 | Brunet | .................. G06F 3/0441 345/173 |
| 2016/0195944 | A1* | 7/2016 | Gur | ........................ G06F 3/0442 345/174 |
| 2017/0147860 | A1* | 5/2017 | Yang | .................. G06V 40/1306 |
| 2018/0260045 | A1* | 9/2018 | Lee | ...................... G06F 3/03545 |

\* cited by examiner

*Primary Examiner* — Hong Zhou
(74) *Attorney, Agent, or Firm* — WPAT, PC

(57) ABSTRACT

There is provided a capacitive touch control system adapted to detect low frequency signals, including a touch panel and an analog front end. The analog front end includes a frequency booster, which boosts a low frequency signal outputted by the touch panel using a variable reference frequency corresponding to different function symbols of the low frequency signal such that resistance of a resistor of an amplifier in the analog front end needs not to be increased thereby reducing the manufacturing cost and a leakage voltage drop on the resistor.

17 Claims, 4 Drawing Sheets

CAPACITIVE TOUCH CONTROL SYSTEM WITH FREQUENCY BOOSTER

The present application is a continuation application of U.S. patent application Ser. No. 17/739,768 filed on May 9, 2022, the disclosure of which is hereby incorporated by reference herein in its entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an interactive input system and, more particularly, to a capacitive touch control system adopted with a frequency booster for detecting low frequency signals.

2. Description of the Related Art

The capacitive touch panel can provide a better user experience, and thus is broadly applied to various electronic devices, e.g., applied to a display device to form a touch display device.

Please refer to FIG. 1, it is a schematic diagram of a capacitive touch control system including multiple driving circuits 11, a touch panel 12, an analog front end 13, an analog-to-digital converter (ADC) 14 and a digital backend 15. The driving circuits 11 drive the touch panel 12 with a drive signal Sd at each driving electrode, and the touch panel 12 outputs a detected signal So respectively at each sensing electrode. The driving electrodes (shown as longitudinal lines) and sensing electrodes (shown as transverse lines) of the touch panel 12 generate mutual capacitance Cm. The analog front end 13 includes an amplifier 131 and an anti-aliasing filter (AAF) 132 to amplify and filter the detected signal So. The ADC 14 converts analog signals to digital signals, which are provided to the digital backend 15 for identifying a touch position.

In capacitive touch panels nowadays, in addition to detecting the touch control of the user finger(s), the capacitive touch panels can also receive external signals from a touch pen to increase operation functions.

In the case that the external signals from a touch pen are low frequency signals (e.g., lower than 45 KHz), to allow the capacitive touch control system to be able to detect the low frequency signals, traditionally resistance of a resistor Rf in the amplifier 131 is increased and capacitance of a capacitor Cf therein is reduced such that the low frequency signals can pass a passband of the analog front end 13. However, increasing the resistance of the resistor Rf can also lead to problems of increasing a leakage voltage drop on the resistor Rf and the manufacturing cost.

Accordingly, the present disclosure provides a capacitive touch control system that is further arranged with a frequency booster in the analog front end to avoid increasing resistance of the resistor in the amplifier.

SUMMARY

The present disclosure provides a capacitive touch control system that is arranged with a frequency booster in the analog front end.

The present disclosure further provides a capacitive touch control system whose frequency booster uses different reference frequencies corresponding to different symbol frequencies among a low frequency signal to perform the frequency boosting.

The present disclosure provides a capacitive touch control system including a touch panel and an analog front end. The analog front end is configured to receive a low frequency signal from the touch panel, and includes a frequency booster configured to perform frequency adjustment on the low frequency signal using a reference frequency, wherein when the touch panel is touched by a touch pen, the reference frequency is controlled to be variable.

The present disclosure further provides a capacitive touch control system including a touch panel and an analog front end. The analog front end is configured to receive a low frequency signal from the touch panel, and includes a frequency booster configured to perform frequency adjustment on the low frequency signal using a reference frequency, wherein when the low frequency signal is received by the analog front end in at least one interval, the reference frequency is controlled to be variable, and when the low frequency signal is not received by the analog front end in at least one interval, the reference frequency is controlled to be constant.

The present disclosure further provides a capacitive touch control system including a touch panel and an analog front end. The analog front end is configured to receive a low frequency signal, which comprises multiple signal frequencies and multiple blank intervals each between two signal frequencies, from the touch panel, and includes a frequency booster configured to perform frequency adjustment on the low frequency signal using a reference frequency, wherein when the multiple signal frequencies of the low frequency signal is received by the analog front end, the reference frequency is controlled to be variable, and the reference frequency is controlled to be constant within the multiple blank intervals.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
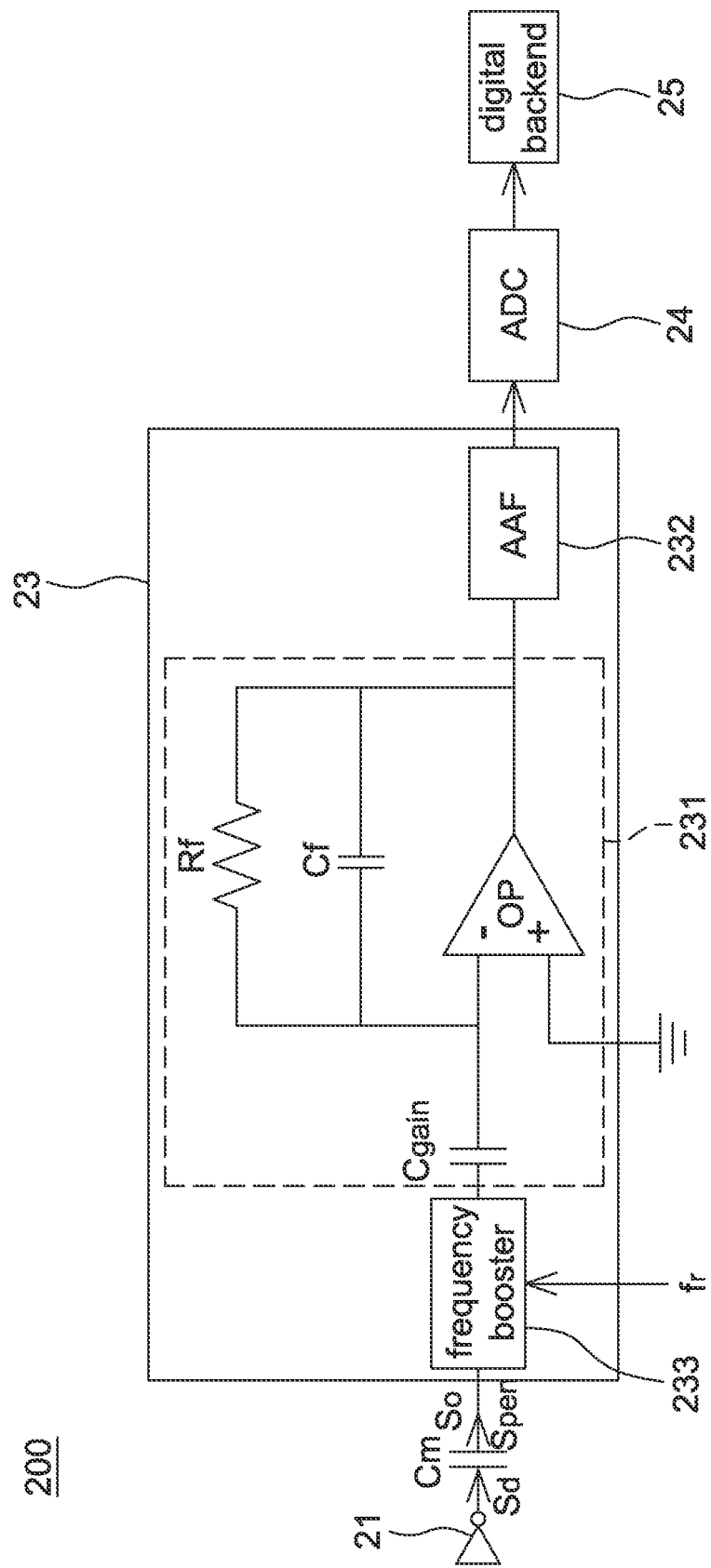
FIG. 2 is a schematic diagram of a capacitive touch control system according to an embodiment of the present disclosure.

Please refer to FIG. 2, it is a schematic block diagram of a capacitive touch control system 200 according to an embodiment of the present disclosure. The capacitive touch control system 200 includes a driving circuit 21, a capacitive touch panel (indicated by a mutual capacitor Cm), an analog front end 23, an analog-to-digital converter (ADC) 24 and a digital backend 25. In some embodiments, the ADC 24 is included in the analog front end 23.

Figure 1:
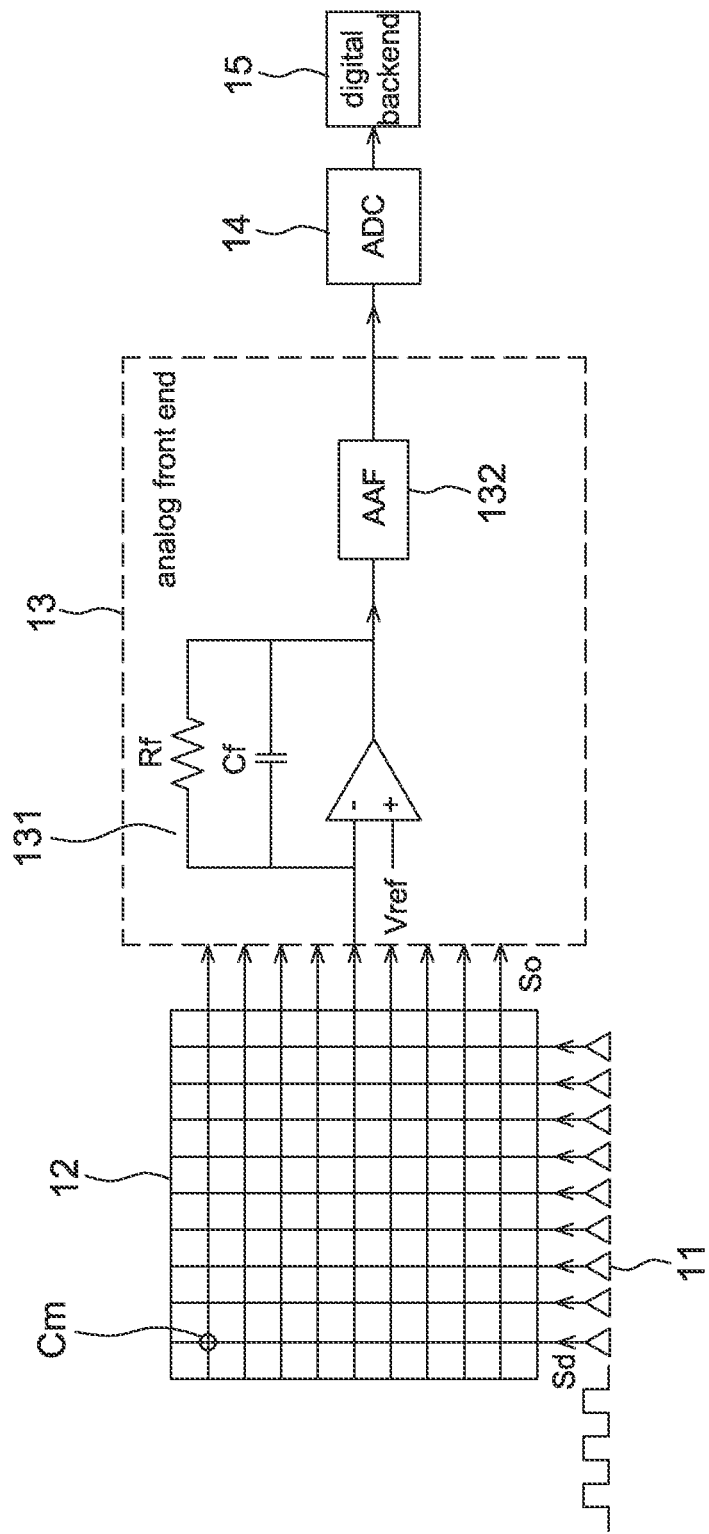
FIG. 1 is a schematic diagram of a conventional capacitive touch control system.

It should be mentioned that a capacitive touch panel (abbreviated as a touch panel hereinafter) of the capacitive touch control system 200 actually includes multiple mutual capacitors Cm and is driven by multiple driving circuits 21 as shown in FIG. 1. Each mutual capacitor Cm is formed by one driving electrode and one sensing electrode of the touch panel, which is known to the art and not a main objective of the present disclosure, and thus the touch panel is abbreviated as Cm in FIG. 2.

Furthermore, although FIG. 2 shows only one analog front end 23 coupled downstream of one sensing electrode, the capacitive touch control system 200 actually includes multiple analog front ends 23 respectively coupled to one sensing electrode, e.g., referring to U.S. patent application Ser. No. 16/703,276 filed on Dec. 4, 2019, and assigned to the same assignee of the present application, and the full disclosure of which is incorporated herein by reference. Each analog front end 23 includes an amplifier 231 and a filter (e.g., shown as anti-aliasing filter AAF, but not limited to) 232. The amplifier 231 and the filter 232 form a bandpass filter, which can also refer to the above U.S. patent application Ser. No. 16/703,276.

The amplifier 231 is, for example, an integrated programmable gain amplifier (IPGA), but not limited to. As shown in FIG. 2, the amplifier 231 includes an operational amplifier OP, a feedback resistor Rf and a compensation capacitor Cf. The feedback resistor Rf and the compensation capacitor Cf are connected between an inverting input end and an output end of the operational amplifier OP. The feedback resistor Rf and the compensation capacitor Cf are used to determine a cutoff frequency and a passband gain of the amplifier 231.

In the present disclosure, the touch panel is used to detect the user finger(s) and a touch pen or a stylus (not shown). The method of detecting the user finger(s) is known to the art, and thus details thereof are not repeated herein. If a touch pen is not approaching the touch panel, detected signals outputted by sensing electrodes of the touch panel do not contain a low frequency signal Spen of the touch pen (e.g., only containing a touch control signal So, which is associated with the drive signal Sd from the driving circuit 21). When the touch pen is approaching or in contact with the touch panel, the detected signals outputted by the sensing electrodes of the touch panel further contain the low frequency signal Spen of the touch pen (e.g., detected signal formed by So+Spen). In the present disclosure, the low frequency signal Spen has a signal frequency lower than a lower cutoff frequency of a bandpass filter formed by the analog front end 23. More specifically, the signal frequency is lower than a lower cutoff frequency of the amplifier 231.

In one aspect, a frequency of the drive signal Sd is higher than 100 KHz, and a frequency of the low frequency signal Spen is lower than 45 KHz, but not limited thereto. As mentioned above, conventionally in order to be able to detect the low frequency signal Spen, resistance of the feedback resistor Rf is increased. The present disclosure further adopts a frequency booster 233 coupled to the inverting input end of the operational amplifier OP to cause a boosted signal associated with the low frequency signal Spen to be within a bandwidth of the bandpass filter (formed by the amplifier 231 and the filter 232).

Figure 3:
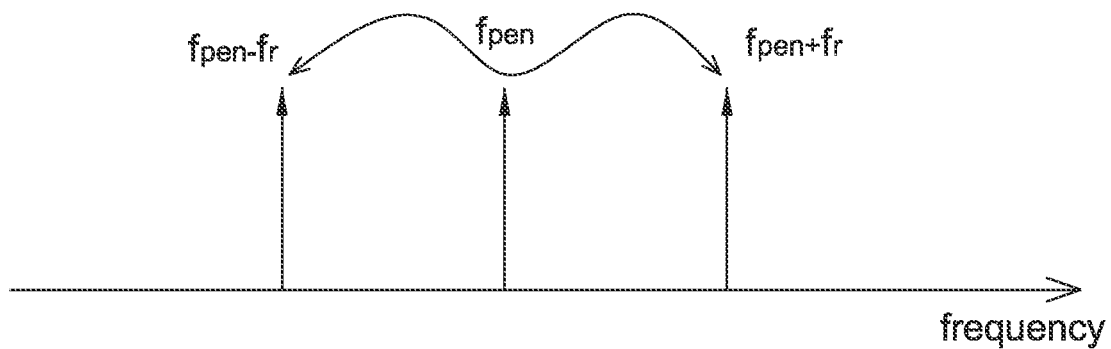
FIG. 3 is an operational schematic diagram of a frequency booster of a capacitive touch control system according to an embodiment of the present disclosure.

More specifically, the analog front end 23 receives a detected signal (e.g., including the touch control signal So or So+Spen) from the touch panel. The frequency booster 233 performs frequency boosting on the low frequency signal Spen, and it is appreciated that the touch control signal So is also frequency boosted. For example, the frequency booster 233 uses a reference frequency fr, which has a variable frequency, to boost the low frequency signal Spen. For example referring to FIG. 3, if a frequency adder is selected as the frequency booster 233, the frequency adder receives the low frequency signal Spen (having a signal frequency fpen) and the reference frequency fr, and then outputs two signals having frequencies fpen−fr and fpen+fr. Preferably, if fpen=fr, the signal having a frequency fpen−fr becomes a dc signal and is not able to pass a passband of the analog front end 23. However, even though fpen is not equal to fr, the signal having a frequency fpen−fr still has a low frequency unable to pass the passband of the analog front end 23 since fpen itself already falls out of the passband of the analog front end 23.

Figure 4:
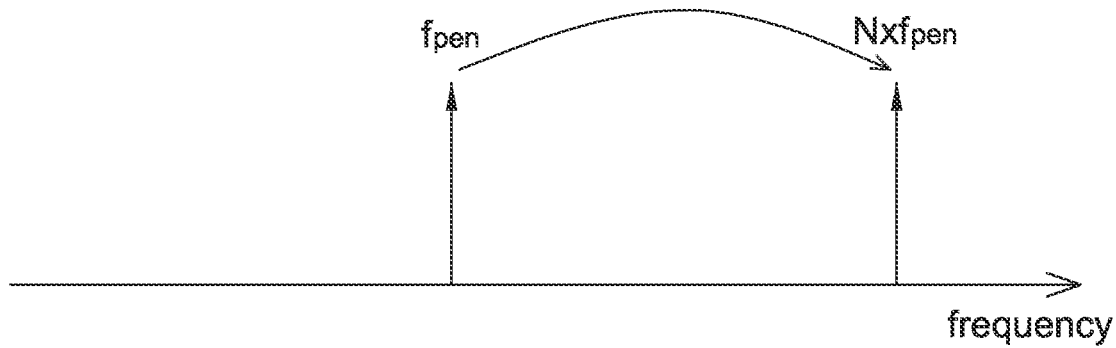
FIG. 4 is another operational schematic diagram of a frequency booster of a capacitive touch control system according to an embodiment of the present disclosure.

For example referring to FIG. 4, if a frequency mixer is selected as the frequency booster 233, the frequency mixer outputs an N-times boosted signal, shown as N×fpen. Preferably, a number of N is selected to cause N×fpen to be within the passband of the analog front end 23. For example, ×4 mixer shown in FIG. 5.8 cited in "CMOS Nanoelectronics: Analog and RF VLSI Circuit" edited by Krzysztof Iniewski can be selected as the frequency booster in the present disclosure, but the present disclosure is not limited thereto. The frequency booster 233 of the present disclosure may use other known circuits without particular limitations as long as the signal frequency fpen is boosted to be within the passband of the analog front end 23 (or higher than the lower cutoff frequency of the amplifier 231).

The amplifier 231 is coupled to the frequency booster 233 for amplifying a boosted signal outputted therefrom. The filter 232 is used to filter the boosted signal. The ADC 24 is used to convert the analog signal (i.e. amplified and filtered frequency-boosted signal) to a digital signal. The operations of the filter 232 and the ADC 24 are known to the art, e.g., also referring to the above U.S. patent application Ser. No. 16/703,276.

The digital backend 25 is used to identify whether a user finger or a touch pen is on the touch penal. In other words, the digital backend 25 is used to identify whether the touch panel outputs a low frequency signal Spen, which is sent from the touch pen. When a low frequency signal Spen is recognized, the touch panel is identified to output the low frequency signal Spen, meaning a touch pen nearby. In one aspect, the low frequency signal Spen is a frequency modulated signal, and the digital backend 25 (e.g., a processor therein) demodulates the detected signal and identifies amplitude of the low frequency signal Spen. When the amplitude exceeds a threshold, it means that the touch panel receives and outputs the low frequency signal Spen. The frequency modulation and demodulation are known to the art, and thus are not described herein.

In one aspect, the digital backend 25 further recognizes a start of the low frequency signal Spen. Please refer to FIG. 5, it shows a schematic diagram of a time pattern of the low frequency signal Spen, including a beacon symbol as a start symbol or as a flag signal of the low frequency signal Spen. Which means while a beacon symbol is occurred, the stylus is ready to emit the low frequency signal Spen. The beacon symbol has a length Td_0 and a frequency fpen_0. The digital backend 25 recognizes the beacon symbol according to the length Td_0 and the frequency fpen_0 thereof, and confirms a touch pen appearing on the touch panel and performs the synchronization according to the beacon symbol. In one aspect, even though the digital backend 25 identifies that the demodulated low frequency signal Spen has amplitude larger than a predetermined threshold, the touch pen is not identified appearing (i.e. not performing corresponding control) until the beacon symbol is recognized. That is, appearance of the touch pen is confirmed after the beacon symbol is recognized and then the corresponding control is executed.

Furthermore, the low frequency signal Spen further includes multiple function symbols (e.g., shown as Fun I to Fun V) corresponding to multiple functions of the touch pen, e.g., hovering, eraser, ink or the like, but not limited to. The multiple functions respectively include a length (e.g., shown as Td_1 to Td_5) and a frequency (e.g., shown as fpen_1 to fpen_5). At least one of the multiple lengths and the multiple frequencies of the multiple function symbols are different from one another for distinguishing different function symbols. That is, the pairs (Td_1, fpen_1), (Td_2, fpen_2), (Td_3, fpen_3), (Td_4, fpen_4), and (Td_5, fpen_5) are not all the same. At least one of the length and the frequency of the beacon symbol is different from the multiple lengths and the multiple frequencies of the multiple function symbols for distinguishing the beacon symbol. That is, at least one of (Td_0, fpen_0) is different from (Td_1, fpen_1), (Td_2, fpen_2), (Td_3, fpen_3), (Td_4, fpen_4), and (Td_5, fpen_5).

Because the low frequency signal Spen includes various signal frequencies, to optimize the boosting performance, the reference frequency fr inputted into the frequency booster 233 changes corresponding to the beacon symbol and the multiple function symbols, e.g., controlled by the digital backend 25 or by an additional frequency control circuit arranged in the analog front end 23.

For example, if a frequency adder is used as the frequency booster 233, corresponding to the beacon symbol, the reference frequency fr=fpen_0; corresponding to the function symbol Fun I, the reference frequency fr=fpen_1; and so on. In another aspect, the reference frequency fr is always kept identical, e.g., equal to fpen_0 or another predetermined constant value.

Figure 5:
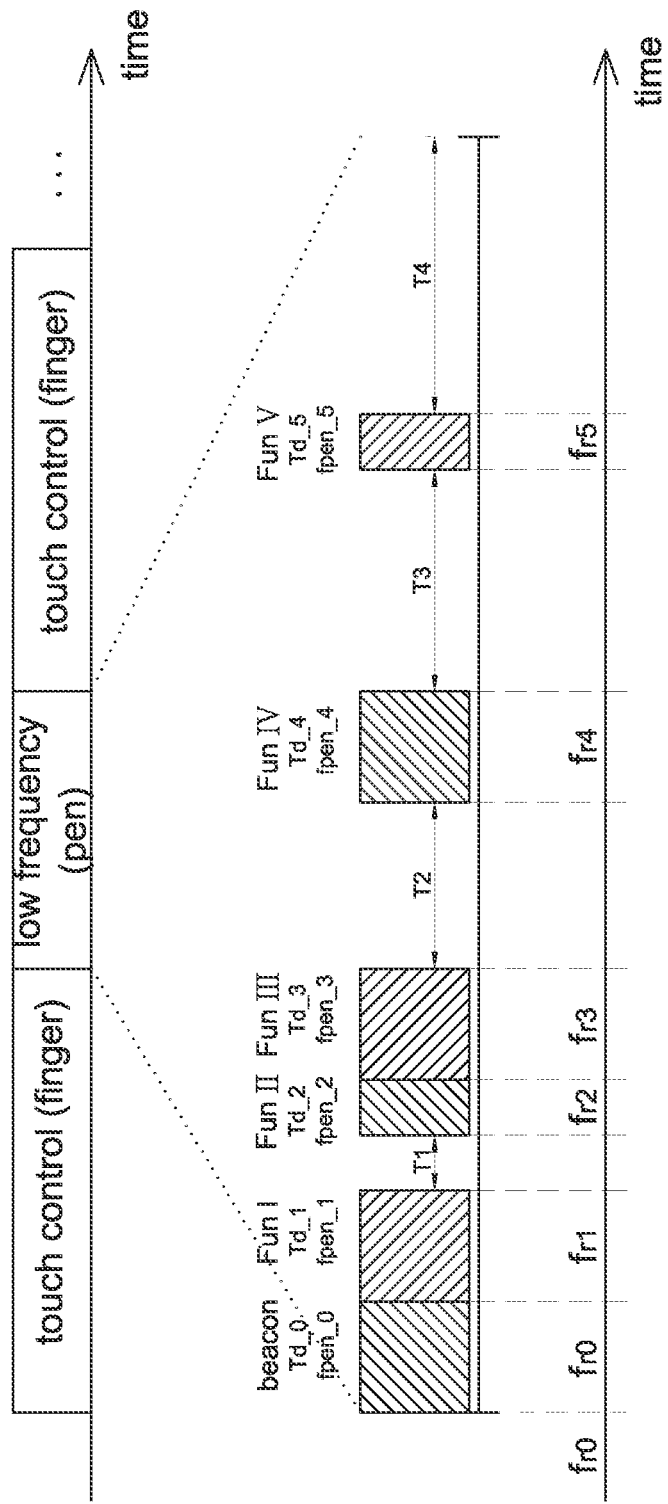
FIG. 5 is a schematic diagram an operating method of a capacitive touch control system according to an embodiment of the present disclosure.

In one aspect, when the digital backend 25 identifies that there is a user finger on the touch panel (or the touch panel not outputting the low frequency signal Spen or before recognizing a beacon symbol of the low frequency signal Spen outputted by the touch pen), e.g., an interval of "touch control" shown in FIG. 5, the reference frequency fr is controlled as a constant value, which is equal to, for example, the frequency fpen_0 of the beacon symbol or equal to a frequency used by the frequency booster 233 in boosting the frequency fpen_0 of the beacon symbol. When the digital backend 25 identifies that there is a touch pen on the touch panel (or the touch panel outputting the low frequency signal Spen or recognizing the beacon symbol of the low frequency signal Spen outputted by the touch pen), the reference frequency fr is controlled to be variable, which is sequentially arranged to be equal to the frequency fpen_1 to the frequency fpen_5, or equal to a frequency used by the frequency booster 233 in boosting the frequency fpen_1 to the frequency fpen_5, sequentially. It should be mentioned that the time pattern of the low frequency signal Spen is not limited to that shown in FIG. 5, and is determined according to actual applications.

If there are blank intervals (i.e. not including any symbol) between the multiple function symbols, e.g., T1 to T4 shown in FIG. 5, the digital backend 25 is arranged to perform the touch control detection within the blank intervals T1 to T4, i.e. identifying whether there is a user finger on the touch panel. In different blank intervals T1 to T4, the reference frequency fr is set as a constant value or to be variable. For example, the reference frequency fr is set as the frequency fpen_0 of the beacon symbol; or, the reference frequency fr is set to be equal to a frequency of a previous function symbol. For example, in the blank interval T1, the reference frequency fr is set as the frequency fpen_1; in the blank interval T2, the reference frequency fr is set as the frequency fpen_2; and so on.

Furthermore, in the aspect that the frequency booster 233 is not able to directly boost the signal frequency fpen to a range of the passband of the bandpass filter, the analog front end 23 further includes a gain capacitor Cgain coupled between the frequency booster 233 and the inverting input end of the operational amplifier OP, and capacitance of the gain capacitor Cgain is smaller than capacitance of the compensation capacitor Cf.

In the present disclosure, preferably the capacitive touch control system previously records the time pattern of a low frequency signal Spen such that after a beacon symbol of the low frequency signal Spen is recognized, the reference frequency fr is adjusted corresponding to different symbols according to the recorded time pattern.

As mentioned above, in conventional capacitive touch control systems, in order to detect low frequency signals, resistance of a resistor in an amplifier for amplifying detected signals is increased such that the manufacturing cost increased and the leakage voltage can also be increased. Accordingly, the present disclosure further provides a capacitive touch control system (e.g., FIG. 2) that is further arranged with a frequency booster in an analog front end thereof such that a large resistor is not required in the amplifier to allow low frequency signals to go through a passband of the analog front end. Furthermore, the objective of optimizing the frequency boosting is achieved by dynamically adjusting a reference frequency inputted to the frequency booster.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive touch control system, comprising:
a touch panel;
an analog front end, configured to receive a low frequency signal from the touch panel, and comprising:
    a frequency booster, configured to perform frequency adjustment on the low frequency signal using a reference frequency, wherein when the touch panel is touched by a touch pen, the reference frequency is controlled to be variable;
    an operational amplifier, coupled to an output of the frequency booster, and having an inverting input end coupled to the frequency booster and a non-inverting input end; and a gain capacitor coupled between the frequency booster and the inverting input end of the operational amplifier.

2. The capacitive touch control system as claimed in claim 1, wherein
the low frequency signal comprises a beacon symbol and multiple function symbols, and at least one of a length and a frequency of the beacon symbol is different from multiple lengths and multiple frequencies of the multiple function symbols.

3. The capacitive touch control system as claimed in claim 2, wherein
the reference frequency is changed corresponding to the beacon symbol and the multiple function symbols.

4. The capacitive touch control system as claimed in claim 3, further comprising a digital backend configured to
control the reference frequency to be equal to the frequency of the beacon symbol upon identifying that the touch panel does not output the low frequency signal.

5. The capacitive touch control system as claimed in claim 3, wherein
there are blank intervals between the multiple function symbols, which do not contain any symbol, and
within the blank intervals, the reference frequency is arranged to be equal to the frequency of the beacon symbol.

6. The capacitive touch control system as claimed in claim 3, wherein
there are blank intervals between the multiple function symbols, which do not contain any symbol, and
within the blank intervals, the reference frequency is arranged to be equal to a frequency of a previous function symbol.

7. The capacitive touch control system as claimed in claim 2, further comprising a digital backend configured to
recognize the beacon symbol according to the length and the frequency of the beacon symbol, and
identify that the touch panel outputs the low frequency signal upon recognizing the beacon symbol.

8. The capacitive touch control system as claimed in claim 1, wherein the analog front end further comprises:
a feedback resistor, coupled between the inverting input end and an output end of the operational amplifier; and
a compensation capacitor, coupled between the inverting input end and the output end of the operational amplifier.

9. The capacitive touch control system as claimed in claim 8, wherein
capacitance of the gain capacitor is smaller than that of the compensation capacitor.

10. A capacitive touch control system, comprising:
a touch panel;
an analog front end, configured to receive a low frequency signal from the touch panel, and comprising:
a frequency booster, configured to perform frequency adjustment on the low frequency signal using a reference frequency;
an operational amplifier, coupled to an output of the frequency booster, and having an inverting input end coupled to the frequency booster and a non-inverting input end; and
a gain capacitor coupled between the frequency booster and the inverting input end of the operational amplifier, wherein
when the low frequency signal is received by the analog front end in at least one interval, the reference frequency is controlled to be variable, and
when the low frequency signal is not received by the analog front end in at least one interval, the reference frequency is controlled to be constant.

11. The capacitive touch control system as claimed in claim 10, further comprising a digital backend configured to identify a touch pen on the touch penal according to a beacon symbol of the low frequency signal sent from the touch pen.

12. The capacitive touch control system as claimed in claim 11, wherein the digital backend is configured to control the reference frequency as a constant value before recognizing the beacon symbol of the low frequency signal sent from the touch pen.

13. The capacitive touch control system as claimed in claim 11, wherein the digital backend is configured to control the reference frequency to be equal to a frequency of the beacon symbol before recognizing the beacon symbol of the low frequency signal sent from the touch pen.

14. The capacitive touch control system as claimed in claim 11, wherein
the low frequency signal further comprises multiple function symbols corresponding to multiple functions of the touch pen, and at least one of multiple lengths and multiple frequencies of the multiple function symbols are different from one other.

15. The capacitive touch control system as claimed in claim 14, wherein the reference frequency is changed corresponding to the multiple function symbols.

16. The capacitive touch control system as claimed in claim 14, wherein
there are blank intervals between the multiple function symbols, which do not contain any symbol, and
within the blank intervals, the reference frequency is arranged to be equal to a frequency of the beacon symbol.

17. A capacitive touch control system, comprising:
a touch panel;
an analog front end, configured to receive a low frequency signal, which comprises multiple signal frequencies and multiple blank intervals each between two signal frequencies, from the touch panel, and comprising:
a frequency booster, configured to perform frequency adjustment on the low frequency signal using a reference frequency, wherein
when the multiple signal frequencies of the low frequency signal is received by the analog front end, the reference frequency is controlled to be variable, and
the reference frequency is controlled to be constant within the multiple blank intervals.

\* \* \* \* \*